United States Patent
Hackner

(10) Patent No.: US 11,673,485 B2
(45) Date of Patent: Jun. 13, 2023

(54) METHOD FOR CONTROLLING AN ELECTRICAL SYSTEM OF AN ELECTRICALLY DRIVABLE MOTOR VEHICLE HAVING A PLURALITY OF BATTERIES, AND ELECTRICAL SYSTEM OF AN ELECTRICALLY DRIVABLE MOTOR VEHICLE HAVING A PLURALITY OF BATTERIES

(71) Applicant: AUDI AG, Ingolstadt (DE)

(72) Inventor: Thomas Hackner, Greding (DE)

(73) Assignee: Audi AG, Ingolstadt (DE)

( * ) Notice: Subject to any disclaimer, the term of this patent is extended or adjusted under 35 U.S.C. 154(b) by 274 days.

(21) Appl. No.: 16/769,450

(22) PCT Filed: Nov. 26, 2018

(86) PCT No.: PCT/EP2018/082498
§ 371 (c)(1),
(2) Date: Jun. 3, 2020

(87) PCT Pub. No.: WO2019/110344
PCT Pub. Date: Jun. 13, 2019

(65) Prior Publication Data
US 2020/0384891 A1 Dec. 10, 2020

(30) Foreign Application Priority Data
Dec. 4, 2017 (DE) .................... 10 2017 221 825.8

(51) Int. Cl.
*B60L 58/22* (2019.01)
*B60L 50/60* (2019.01)
(Continued)

(52) U.S. Cl.
CPC .............. *B60L 58/22* (2019.02); *B60L 50/66* (2019.02); *B60L 58/12* (2019.02); *B60L 58/20* (2019.02);
(Continued)

(58) Field of Classification Search
CPC .......... B60L 58/22; B60L 58/12; B60L 58/24; B60L 58/20; B60L 50/66; B60L 2240/545
(Continued)

(56) References Cited

U.S. PATENT DOCUMENTS

| 6,583,599 B1 | 6/2003 | Phillips et al. |
| 10,046,662 B2 | 8/2018 | Saint-Marcoux et al. |

(Continued)

FOREIGN PATENT DOCUMENTS

| DE | 10153509 A1 | 8/2002 |
| DE | 102007004279 A1 | 7/2008 |

(Continued)

OTHER PUBLICATIONS

International Preliminary Report on Patentability and Written Opinion of the International Searching Authority directed to related International Patent Application No. PCT/EP2018/082498, dated Jun. 9, 2020, with attached English-language translation; 11 pages.

(Continued)

*Primary Examiner* — Daniel Kessie
*Assistant Examiner* — Dru Parries
(74) *Attorney, Agent, or Firm* — Sterne, Kessler, Goldstein & Fox P.L.L.C.

(57) ABSTRACT

The disclosure relates to a method for controlling an electrical system of an electrically drivable motor vehicle, wherein the electrical system includes at least one lead battery and at least one lithium battery. Initially, a lower and a first upper threshold value for a state of charge of the lithium battery are determined. Then, a second upper thresh- (Continued)

old value which is higher than the first upper threshold value is determined. During the driving operation of the motor vehicle, a state of charge of the lithium battery is set between a lower and a second upper threshold value. When the motor vehicle is switched off, the state of charge of the lithium battery is determined. If the state of charge of the lithium battery is higher than the first upper threshold value, the state of charge of the lithium battery is lowered to the first upper threshold value.

20 Claims, 3 Drawing Sheets

(51) Int. Cl.
    *B60L 58/12*     (2019.01)
    *B60L 58/20*     (2019.01)
    *B60L 58/24*     (2019.01)

(52) U.S. Cl.
    CPC ......... *B60L 58/24* (2019.02); *B60L 2240/545* (2013.01)

(58) Field of Classification Search
    USPC .......................................................... 701/22
    See application file for complete search history.

(56) References Cited

U.S. PATENT DOCUMENTS

| | | |
|---|---|---|
| 10,279,699 B2 | 5/2019 | Fink |
| 2014/0184153 A1 | 7/2014 | Saint-Leger et al. |
| 2014/0214251 A1* | 7/2014 | Sugiyama ............... B60L 58/20 903/930 |
| 2015/0191098 A1* | 7/2015 | Chang .................... B60L 58/16 701/22 |
| 2015/0329007 A1 | 11/2015 | Matsunaga et al. |
| 2016/0250944 A1 | 9/2016 | Christ et al. |
| 2018/0099577 A1* | 4/2018 | Nagata .................... B60L 58/13 |
| 2019/0044367 A1* | 2/2019 | Koike ...................... H02J 1/10 |

FOREIGN PATENT DOCUMENTS

| | | |
|---|---|---|
| DE | 102014201351 A1 | 7/2015 |
| DE | 102014201358 A1 | 7/2015 |
| DE | 102015203491 A1 | 9/2016 |
| DE | 102016005125 A1 | 11/2017 |
| DE | 102016007505 A1 | 12/2017 |
| FR | 3002045 A1 | 8/2014 |
| WO | WO 2006/112510 A1 | 10/2006 |
| WO | WO 2007/042724 A1 | 4/2007 |

OTHER PUBLICATIONS

International Search Report and Written Opinion of the International Searching Authority directed to related International Patent Application No. PCT/EP2018/082498, dated Apr. 17, 2020, with attached English-language translation; 16 pages.

Hofmann. Peter: "Hybridfahrzeuge: ein alternatives Antriebssystem für die Zukunft," excerpt, Table 2.1, (German) 2nd Ed., 2014, with attached English-language translation; 3 pages.

Chinese Application No. 201880078033.4, Office Action dated Nov. 1, 2022, with attached English Translation from EPO Global Dossier, 17 pages.

* cited by examiner

METHOD FOR CONTROLLING AN ELECTRICAL SYSTEM OF AN ELECTRICALLY DRIVABLE MOTOR VEHICLE HAVING A PLURALITY OF BATTERIES, AND ELECTRICAL SYSTEM OF AN ELECTRICALLY DRIVABLE MOTOR VEHICLE HAVING A PLURALITY OF BATTERIES

TECHNICAL FIELD

The present disclosure relates to a method for controlling an electrical system of an electrically drivable motor vehicle, wherein the electrical system includes at least one lead battery and at least one lithium battery, which are electrically coupled to one another via a coupling device, wherein the at least one lead battery is assigned a first battery monitoring module and the at least one lithium battery is assigned a second battery monitoring module. The method includes the following step: Determining a lower and a first upper threshold value for a state of charge of the lithium battery. The disclosure also relates to an electrical system of an electrically drivable motor vehicle including at least one lead battery, at least one lithium battery which is electrically coupled to the lead battery via a coupling device, a first battery monitoring module which is assigned to the at least one lead battery, a second battery monitoring module which is assigned to the at least one lithium battery, a state-of-charge control device of the lithium battery and a storage device in which a lower and a first upper threshold value for a state of charge of the lithium battery are stored.

BACKGROUND

As part of climate protection, the $CO_2$ specifications for motor vehicles are increasingly tightened. To take this into account, there are on-board electrical system concepts with more powerful energy stores compared to lead batteries or on-board electrical system concepts with more than one energy store. By using recuperation devices, for example belt starter generators, it is possible to recuperate more energy, for example in the braking phases, and also to lower the load point in pulling phases in order to relieve the drive of the motor vehicle, for example an internal combustion engine. By lowering the load point, the internal combustion engine delivers a torque that is not sufficient to correspond to a driver's desired torque. As mentioned, the difference can be supplied, for example, by a belt starter generator, which for this purpose takes electrical energy from an energy store. It can thereby be achieved that the internal combustion engine is operated in an optimum range in terms of efficiency. In this way, fuel can be saved.

The optimal operating range of the internal combustion engine can also be greater than the driver's desired torque. In this case, the belt starter generator can be controlled accordingly and the energy for generating the differential torque can be converted into electrical energy. In this case, since the engine is operating at an optimal operating point, the electrical energy is generated efficiently. This is a controlled load point increase.

In such on-board electrical systems, energy stores are required which can absorb and remove more energy and power than in a conventional on-board electrical system with a 12V lead battery. It has been found that a combination of a lead battery with a lithium battery is particularly advantageous. The lead battery provides high energy content at a low cost, while the lithium battery can be used as a cycle-proof storage for recuperation. The lead battery is preferably arranged in a first voltage range, in particular a low voltage range, of the on-board electrical system and the lithium battery in a second voltage range, in particular a high voltage range. The low voltage range can be, for example, at 12V level, the high voltage range at 48V level. Then the coupling device is preferably a DC/DC converter. If the lithium and lead batteries are at the same voltage level, that is to say both are at the 12V level, for example, the coupling device is a switch with which the lithium and lead batteries can be coupled to one another in an electrically conductive manner or can be electrically separated from one another.

A mild hybrid electric vehicle (MHEV) is understood to mean hybrid vehicles in which the electric drive part supports the internal combustion engine to increase performance. 6-14 kW/t are usually given as electric motor outputs. The total capacity of lithium batteries, as are typically used in mild hybrid electric vehicles, is usually between 5 Ah and 20 Ah. The total capacity of lead batteries used in such motor vehicles is usually between 25 Ah and 80 Ah.

Due to technological constraints, in particular the design of the service life, the usable state of charge SOC of a lithium battery lies between a lower threshold value of approximately 20% and an upper threshold value of approximately 80%. The usable SOC range for a lead battery is between about 70% and 100%.

FIG. 1 shows an electrical system 10 of an electrically drivable motor vehicle known from the prior art. This comprises an on-board electrical system with a low voltage range 12 and a high voltage range 14, which are coupled to one another via a DC/DC converter 16. In the example shown, the low voltage is approximately 12 V, the high voltage is approximately 48 V. The low voltage range 12 includes a starter 18 for starting an internal combustion engine of the motor vehicle, a lead battery 20 and an electrical consumer 22 shown by way of example. The lead battery 20 is assigned a battery monitoring module 24, which makes it possible to monitor the voltage applied to the lead battery 20 and the current flowing into and out of the lead battery 20. The battery monitoring module 24 comprises a voltage measuring device 26 and a current measuring device 28.

The high voltage range 14 comprises a lithium battery 30, to which a battery monitoring module 32 is assigned. The battery monitoring module 32 comprises a voltage measuring device 34 and a current measuring device 36.

An electrical machine 40, in particular a belt starter generator, is coupled to the lithium battery 30 and the DC/DC converter 16 via a coupling resistor 38. A voltage measuring device 42 is assigned to the electrical machine 40. A current measurement is usually integrated in the electrical machine 40. In the event that no current measurement is integrated in the electrical machine 40, a current measuring device is to be assigned to the electrical machine 40, which then measures the current flowing into and out of the electrical machine 40.

In the prior art, there are already various approaches for new on-board electrical system concepts:

An on-board electrical system and a method for operating an on-board electrical system are known from DE 10 2014 201 358 A1. In this case, a vehicle comprises a high-voltage and a low-voltage electrical system and supplies the low-voltage electrical system with energy from the high-voltage electrical system via a voltage converter as soon as the state of charge of a battery in the low-voltage electrical system falls below a defined level.

An on-board electrical system and a method for operating an on-board electrical system are also known from DE 10 2014 201 351 A1. In this case, a vehicle comprises on-board electrical systems of different voltages and supplies the on-board electrical system with low voltage with energy from the on-board electrical system with higher voltage as soon as a state-of-charge threshold value of the on-board electrical system is below the low voltage.

A multi-voltage electrical system for a motor vehicle is known from DE 10 2007 004 279 A1. A low-voltage electrical system is supplied with energy from a high-voltage electrical system by means of a converter.

In the subsequently published DE 10 2016 007 505 by the present applicant, a method for controlling an electrical system of a hybrid vehicle is described, in which two on-board electrical systems that are electrically coupled to one another by means of a DC/DC converter each comprise an electrical energy store at different DC voltage levels, which provide the same storage capacity for electrical charge. The DC/DC converter is coupled in accordance with a predictive driving operation of the motor vehicle.

DE 10 2016 005 125, which is also subsequently published, describes a method for controlling an energy storage device of a mild hybrid motor vehicle and a state-of-charge control device for a mild hybrid motor vehicle. In this case, at least one charging and one discharging process is monitored during at least one journey with reference to amounts of energy exchanged with the energy storage device, and from this expected amounts of energy for future charging and discharging processes are determined with a predeterminable probability. Based on these determinations, the upper and lower threshold values for a target state of charge range of the energy storage device are determined.

DETAILED DESCRIPTION

Figure 1:
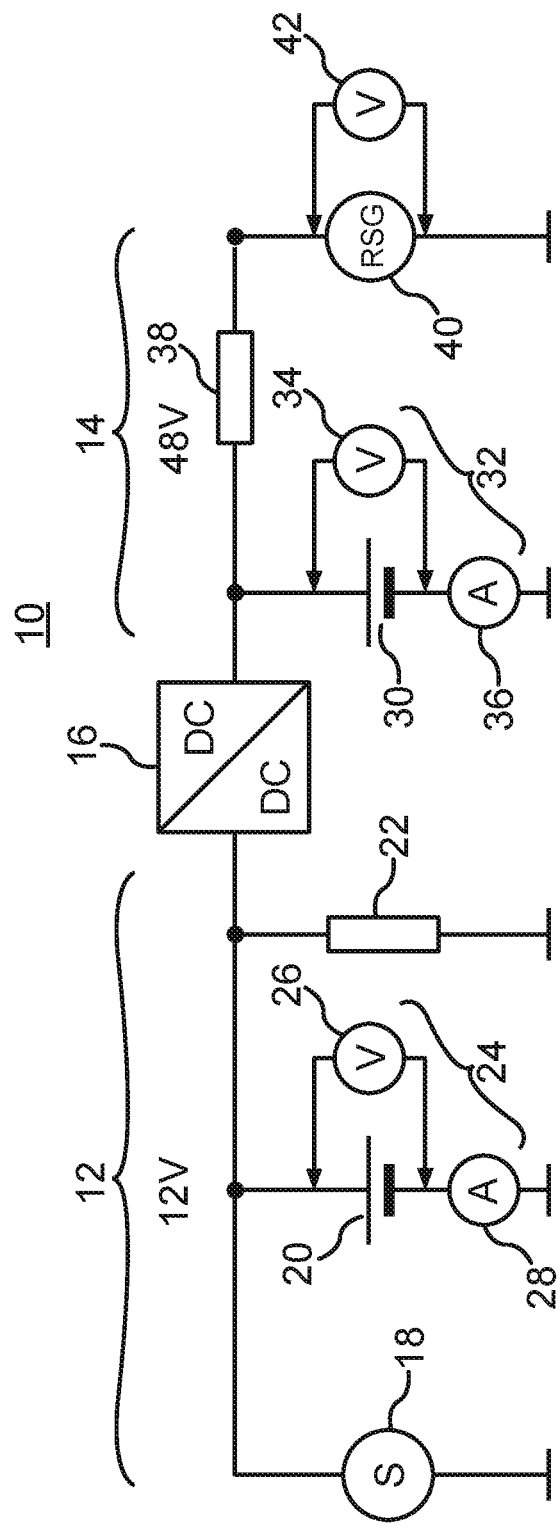
FIG. 1 is a schematic illustration of an electrical system of an electrically drivable motor vehicle known from the prior art.

The object of the present disclosure is to develop a generic method and a generic electrical system such that it enables the most resource-efficient operation of a motor vehicle.

The present disclosure is based on the knowledge that existing resources are better used if the service life of the batteries can be extended and/or fuel can be saved. Amazingly, both desired effects can be achieved by one and the same measure: First of all, it should be noted that storage with a low state of charge is optimal for a lithium battery with regards to the service life. For a lead battery, on the other hand, the highest possible state of charge during storage should be aimed at for a long shelf life. Because the SOC range of over 80% is not used in the prior art for a lithium battery for the reasons mentioned above, larger and thus more expensive and heavier lithium batteries have to be used to cover a required storage requirement.

In some embodiments of the present disclosure, a lithium battery can be temporarily operated with a higher state of charge than 80% while the motor vehicle is traveling, since a short-term increase in state of charge for the lithium battery does not affect the service life. Only when parking the motor vehicle must it be ensured that the state of charge of the lithium battery has been lowered again into the permissible range.

This means that a maximum of the entire storage of the lithium battery can be used while driving, which enables a smaller design of the lithium battery. By temporarily overcharging the lithium battery, the user of the motor vehicle can also park the motor vehicle for longer, at least 50 days, until the motor vehicle can no longer be started.

According to the present disclosure, therefore, a second upper threshold value lying above the first upper threshold value is determined. During the driving operation, a state of charge of the lithium battery is then set between the lower and the second upper threshold value for the state of charge of the lithium battery. When the motor vehicle is switched off, the state of charge of the lithium battery is determined. If this is greater than the first upper threshold value, the state of charge of the lithium battery is reduced to the first upper threshold value. In this way, a larger range of the lithium battery can be used while driving than in the prior art. This does not shorten the service life, since the storage of the lithium battery is discharged into a range that is permissible with regard to the service life after switching off. This means that smaller lithium batteries can be used than in the prior art, which can nevertheless save more fuel than in the prior art. In addition, a larger memory is available for the purposes of recuperation. The available memory of the lithium battery is used optimally.

In the step of lowering the state of charge of the lithium battery, the state of charge of the lithium battery is particularly advantageously reduced by charging the lead battery from the lithium battery. In this way, the state of charge of the lithium battery can be reduced to an optimum range with regard to the service life and the charge status of the lead battery can be increased to an optimum range with regard to the service life. This means that the service life of two energy stores based on different technologies can be increased by one measure.

Due to the fact that the state of charge of the lead battery is usually set to around 80% during driving and this state of charge is usually reached very quickly—even if the charge status of the lead battery was almost 100% before starting, there is generally a storage area of approximately 20% of the lead battery provided to lower the state of charge of the lithium battery. It must be taken into account here that after the motor vehicle is stationary, the state of charge of the lead battery is usually significantly lower than 100% due to a quiescent current consumption by electrical consumers of the motor vehicle. Usually, the lead battery is also discharged when the KL15 signal is "off," for example by a radiator fan run-on in the motor vehicle. For this reason, it is not necessary to continuously check when charging the lithium battery whether, when the motor vehicle is switched off at the moment, there is sufficient storage area available for the lead battery to accommodate the energy content of the lithium battery which is above the first upper threshold value. Usually, it also takes a certain amount of time until the state of charge of the lithium battery has increased from the state of charge when starting to a significantly higher value.

The shutdown of the motor vehicle is usually defined by switching off the KL15 signal from terminal 15, i.e. the internal combustion engine is off and electrical power can no longer be generated by the belt starter generator.

A preferred embodiment of the method according to the present disclosure is characterized by the following further steps, which are carried out between a step b) determining a second upper threshold value above the first upper threshold value and a step c) during the driving operation of the motor vehicle: adjusting a state of charge of the lithium battery between the lower and the second upper threshold value for the state of charge of the lithium battery. The further steps include a step e) determining a temperature of the lithium battery; and a step f) performing steps c) and d) only if the temperature determined in the step e) is below a predeterminable threshold value. This measure takes into account the fact that at high temperatures of the lithium battery, charging into the storage area above the first upper threshold value would be disadvantageous with regard to the service life. This predetermined threshold value for the temperature can be, for example, between 60° C. and 75° C.

Alternatively, the temperature of the lithium battery can be determined in a step g) determining a temperature of the lithium battery and subsequently in a step h) if the temperature determined in the step g) is above a predefinable threshold value: modifying the second upper threshold value for the state of charge of the lithium battery as a function of the temperature determined in the step g) of the lithium battery to a value between the second upper threshold value and the first upper threshold value. If the temperature determined in the step g) is above a predefinable threshold value, the following step can be carried out: Modifying the second upper threshold value for the state of charge of the lithium battery as a function of the temperature of the lithium battery determined in the step g) to a value between the second upper threshold value and the first upper threshold value. In this way, the method according to the present disclosure can also be used at higher temperatures, but then to a limited extent. For example, the second upper threshold value can be lowered from a maximum value to the first upper threshold value for a temperature rise of the lithium battery from 50° C. to 70° C. At temperatures of less than or equal to 50° C., a maximum value for the second upper threshold value is accordingly used, while for temperatures of the lithium battery above 70° C., it is charged only up to the first upper threshold value, as in the prior art.

It has proven to be advantageous if, as the lower threshold value for the lithium battery, a state of charge between 10% and 25%, preferably 20%, for the first upper threshold value, a state of charge between 70% and 90%, preferably 80%, and, for the second upper threshold value, a state of charge between 80% and 100%, preferably between 90% and 100%, more preferably a state of charge of 100% is used. These charge levels are always based on the total capacity of the lithium battery.

It has also proven to be advantageous if a first maximum state of charge between 75% and 85%, preferably of 80%, is used as the state of charge of the lead battery during the driving operation of the motor vehicle. Due to the charging states selected for the lithium battery and for the lead battery, the lithium battery can be used optimally for recuperation on the one hand, and on the other hand discharge into the lead battery is possible after the motor vehicle has been switched off, in order to increase the service life of the lithium battery to optimally influence the life of the lead battery.

In a step d2), if the state of charge of the lithium battery is greater than the first upper threshold value: lowering the state of charge of the lithium battery to the first upper threshold value. The lead battery is preferably charged up to a second maximum state of charge when the motor vehicle is switched off. If this second maximum state of charge is monitored by the first battery monitoring module assigned to the lead battery, overcharging of the lead battery can therefore be reliably prevented. The second maximum state of charge of the lead battery is preferably a state of charge lying above the first maximum state of charge, preferably a state of charge between 90% and 100%, preferably of 100%.

The preferred embodiments presented with reference to the method according to the present disclosure and their advantages apply accordingly, if applicable, for an electrical system according to the disclosure of an electrically drivable motor vehicle.

In the following, an exemplary embodiment of the present disclosure will now be described with reference to the accompanying drawings.

The reference symbols introduced with reference to FIG. 1 are used further for identical and functionally equivalent components.

Figure 2:
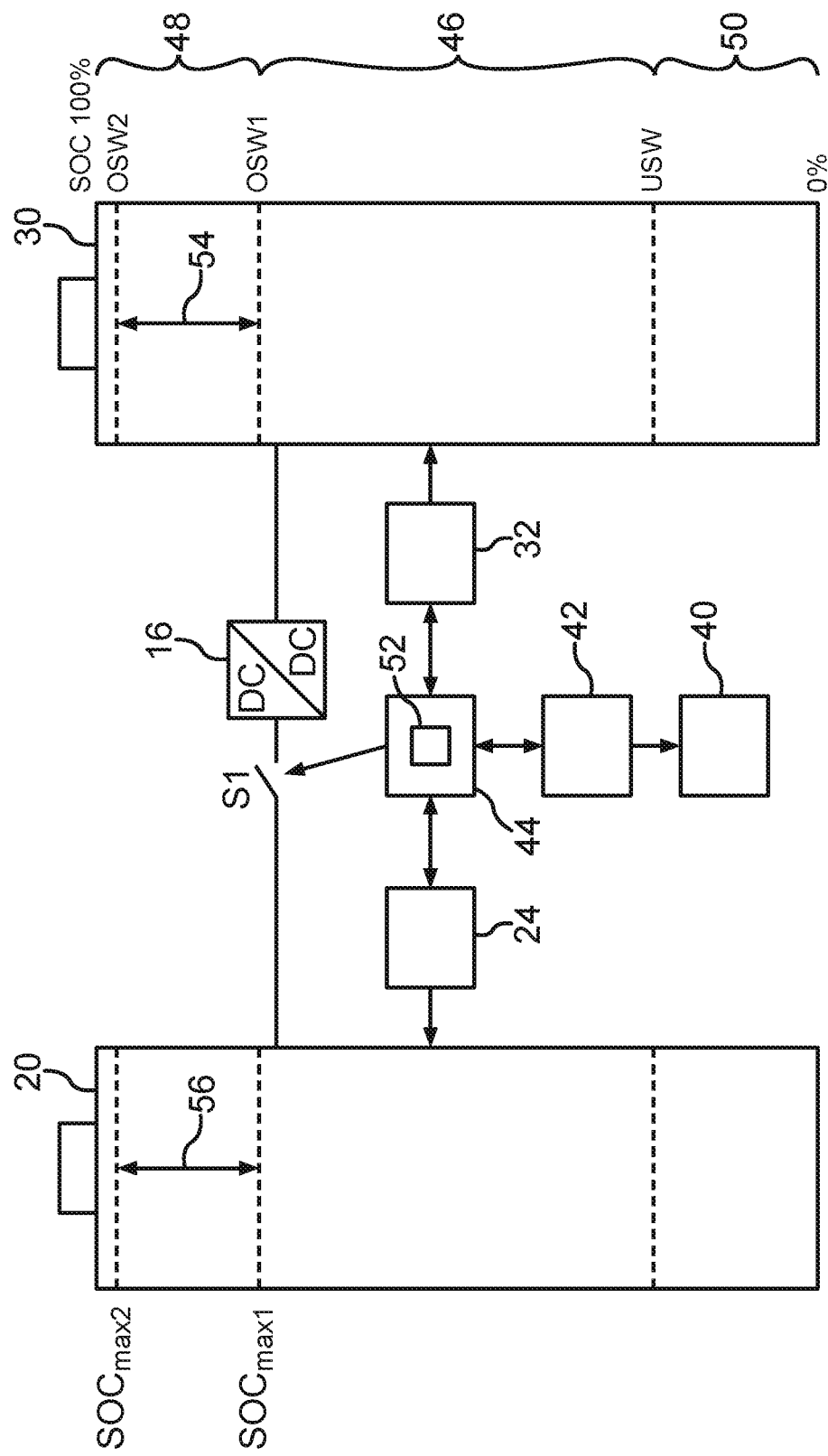
FIG. 2 is a schematic illustration of a method for controlling an electrical system of an electrically drivable motor vehicle, according to some embodiments of the present disclosure.

FIG. 2 shows a schematic illustration to explain an exemplary embodiment of a method according to the disclosure for controlling an electrical system 10 of an electrically drivable motor vehicle. Shown are the lithium battery 30, the lead battery 20 that can thus be coupled via the series connection of a DC/DC converter 16 and an electronic switch S1, the battery monitoring module 32 assigned to the lithium battery 30, and the battery monitoring module 24 assigned to the lead battery 20, and a state-of-charge control device 44 of the lithium battery 30, which is not only designed to control the charging of the lithium battery 30 but also to operate the switch S1.

The usually permitted range of states of charge of the lithium battery 30 is denoted by 46. Above this range is a range 48 which is usually not used due to technological constraints such as the service life mentioned above. A lower range 50 may not be used in particular because an energy reserve must be kept in case the motor vehicle is parked for a long period. The lower threshold value USW is usually 20% of the total capacity of the lithium battery 30, and the first upper threshold value OSW1 is 80%.

In the prior art, the state of charge of the lithium battery 30 is set between the lower threshold value USW and the first upper threshold value OSW1. This range can therefore be used to recuperate energy via a belt starter generator 40 shown in FIG. 1 or for boosting. According to the present disclosure, a second upper threshold value OSW2 is determined, which lies above the first upper threshold value OSW1. In the exemplary embodiment, this upper threshold value OSW2 is 95% of the total capacity of the lithium battery 30. During the driving operation of the motor vehicle, the battery monitoring modules 32 and 24 monitor the energy content and the state of charge of the respective energy store 30, 20. In the DC/DC converter 16, the current is measured via a measuring shunt. All of these variables are transmitted to an energy management device of the motor vehicle, which in the present case is represented by the state-of-charge control device 44. The actual voltage is measured on the belt starter generator 40, see FIG. 1, and is likewise transmitted to the energy management device, here the state-of-charge control device 44. The lower (USW), the first upper (OSW1), and the second upper threshold value (OSW2) are stored in a storage device 52 of the state-of-charge control device 44. A first and a second maximum value $SOC_{max1}$, $SOC_{max2}$ for the state of charge of the lead battery are also stored there.

During the driving operation of the motor vehicle, the state of charge of the lithium battery 30 is set between the lower (USW) and the second upper threshold value OSW2 for the state of charge of the lithium battery 30. Thus, the energy content of the lithium battery 30 indicated by the arrow 54 is additionally available during driving operation of the motor vehicle.

When the motor vehicle is switched off, the state of charge of the lithium battery 30 is determined by the state-of-charge control device 44 via the battery monitoring module 32. If the state of charge of the lithium battery 30 is greater than the first upper threshold value OSW1, the state of charge of the lithium battery 30 is reduced to the first upper threshold value OSW1, namely by closing the switch S1 and charging the lead battery 20 from the lithium battery 30. In order to equalize the voltage levels of the two batteries 20, 30, the DC/DC converter is provided. In the event that the lead battery 20 and the lithium battery are at a comparable voltage level, i.e. the on-board electrical system of the motor vehicle has either a low voltage range 12 or a high voltage range 14, cf. FIG. 1, the DC/DC converter 16 can be omitted. It is then replaced by an electrical switch.

The first maximum value $SOC_{max1}$, which is between 75% and 85% of the total capacity of the lead battery 20, is used as the state of charge of the lead battery 20 to be set during the driving operation of the motor vehicle. In the parked state of the motor vehicle, however, the second maximum value $SOC_{max2}$ is used for the state of charge of the lead battery 20, which is above the first maximum value $SOC_{max1}$ and in the exemplary embodiment is 95% of the total capacity of the lead battery 20. When the motor vehicle is in the parked state, that is to say the terminal 15 is switched off, the engine is switched off and the belt starter generator 40 can no longer generate electrical energy, the area identified by the arrow 56 is available as an additional storage area. The energy content stored in the area of the lithium battery 30 indicated by the arrow 54 can accordingly be recharged into the area indicated by the arrow 56.

Figure 3:
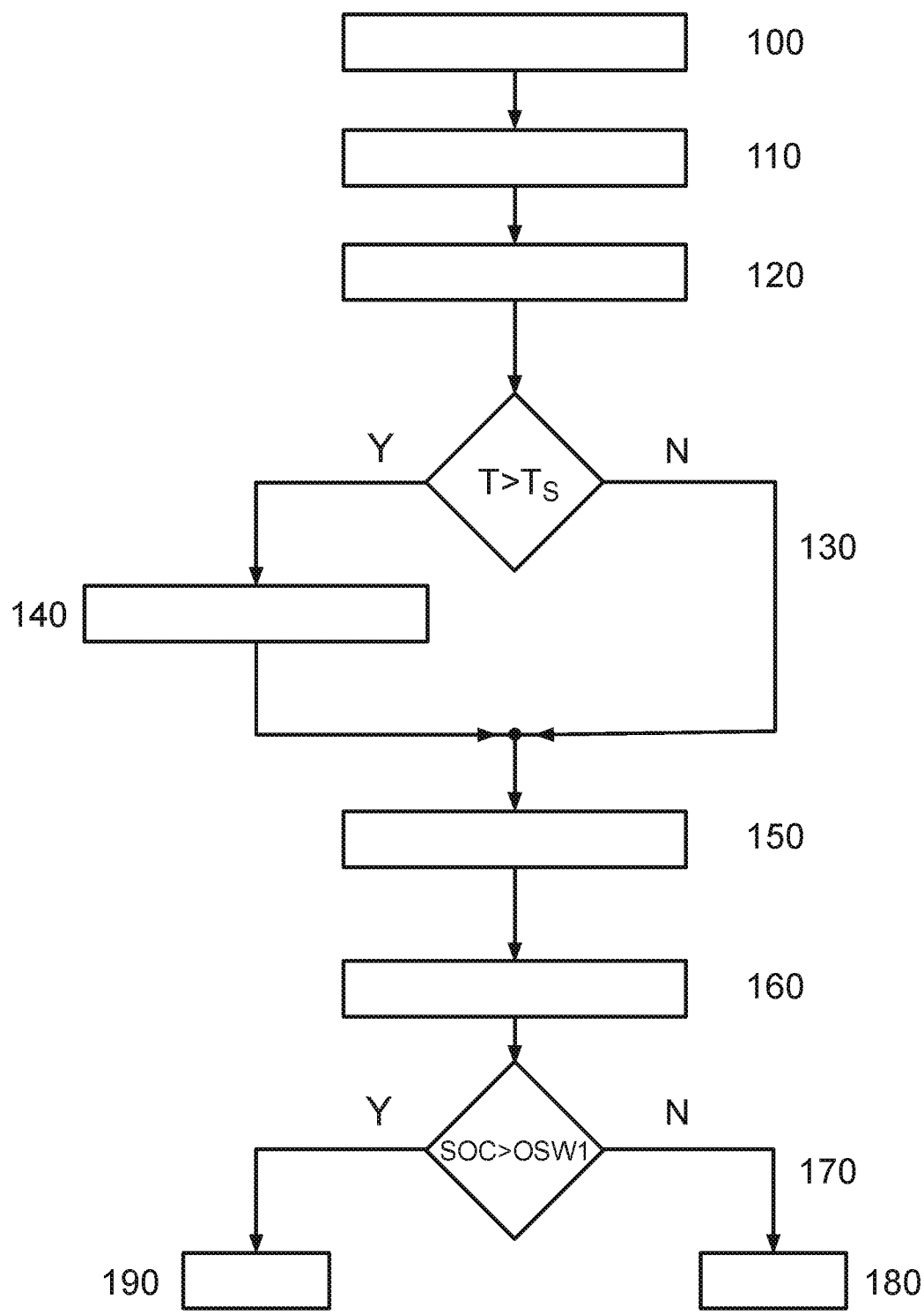
FIG. 3 is a schematic illustration of a signal flow graph, according to some embodiments of the present disclosure.

FIG. 3 shows a signal flow graph to explain an exemplary embodiment of the method according to the present disclosure.

First, a lower and a first upper threshold value USW, OSW1 for a state of charge of the lithium battery 30 are determined in step 100. Then, in step 110, a second upper threshold value OSW2 above the first upper threshold value OSW1 is determined. In step 120, the temperature of the lithium battery 30 is determined. If it is determined in step 130 that the temperature is above a predeterminable threshold value $T_S$, the second upper threshold value OSW2 for the state of charge of the lithium battery 30 is modified to a value between the second upper threshold value OSW2 and the first upper threshold value OSW1 depending on the temperature T of the lithium battery 30 determined in step 120, see step 140. The method then continues in step 150. However, if it is determined in step 130 that the temperature T is lower than the predefinable threshold value $T_S$, the method is also continued in step 150, but with an unmodified second upper threshold value OSW2.

Step 150 relates to the driving operation of the motor vehicle. Here, a state of charge of the lithium battery 30 is set between the lower (USW) and the second upper threshold value OSW2 for the state of charge of the lithium battery 30. Steps 160 and 170 relate to the motor vehicle in the parked state. In step 160, the state of charge of the lithium battery 30 is determined. If it is determined in step 170 that the state of charge is not greater than the first upper threshold value OSW1, the method is ended in step 180. However, if it is determined in step 170 that the state of charge of the lithium battery 30 is greater than the first upper threshold value OSW1, the state of charge of the lithium battery 30 is lowered in step 190 by charging the lead battery 20 from the lithium battery 30 until the state of charge of the lithium battery 30 corresponds to the first upper threshold value OSW1.

The invention claimed is:

1. A method for controlling an electrical system of an electrically drivable motor vehicle, comprising:
    coupling electrically, via a coupling device, a lead battery and a lithium battery of the electrical system;
    assigning a first battery monitoring module to the lead battery and a second battery monitoring module to the lithium battery;
    determining a lower threshold value and a first upper threshold value for a state of charge of the lithium battery;
    determining a second upper threshold value above the first upper threshold value for the state of charge of the lithium battery;
    determining a first maximum value and a second maximum value of a state of charge of the lead battery, wherein the second maximum value is larger than the first maximum value:
    adjusting the state of charge of the lithium battery between the lower threshold value and the second upper threshold value during a driving operation of the motor vehicle;
    using the first maximum value as the state of charge of the lead battery during the driving operation of the motor vehicle; and
    lowering the state of charge of the lithium battery to the first upper threshold value by charging the lead battery up to the second maximum value from the lithium battery when both the motor vehicle is switched off and the state of charge of the lithium battery is greater than the first upper threshold value.

2. The method according to claim 1, further comprising:
    after determining the second upper threshold value, determining a temperature of the lithium battery; and
    executing the adjusting and the lowering the state of charge of the lithium battery when the temperature of the lithium battery is below a predetermined threshold value.

3. The method according to claim 2, further comprising:
    when the temperature of the lithium battery is above the predetermined threshold value, modifying the second upper threshold value as a function of the temperature to a value between the second upper threshold value and the first upper threshold value.

4. The method according to claim 1, further comprising:
    using the state of charge of the lithium battery between 10% and 25% of a total capacity of the lithium battery as the lower threshold value.

5. The method according to claim 4, further comprising:
    using the state of charge of the lithium battery at 20% of the total capacity of the lithium battery as the lower threshold value.

6. The method according to claim 1, further comprising:
    using the state of charge of the lithium battery between 70% and 90% of a total capacity of the lithium battery as the first upper threshold value.

7. The method according to claim 6, further comprising:
    using the state of charge of the lithium battery at 80% of the total capacity of the lithium battery as the first upper threshold value.

8. The method according to claim 1, further comprising:
    using the state of charge of the lithium battery between 80% and 100% of a total capacity of the lithium battery as the second upper threshold value.

9. The method according to claim 8, further comprising:
using the state of charge of the lithium battery between 90% and 100% of the total capacity of the lithium battery as the second upper threshold value.

10. The method according to claim 9, further comprising:
using the state of charge of the lithium battery at 100% of the total capacity of the lithium battery as the second upper threshold value.

11. The method according to claim 1, further comprising:
using the first maximum value between 75% and 85% of a total capacity of the lead battery as the state of charge of the lead battery during the driving operation of the motor vehicle.

12. The method according to claim 11, further comprising:
using the first maximum value of 80% of the total capacity of the lead battery as the state of charge of the lead battery during the driving operation of the motor vehicle.

13. The method according to claim 1, further comprising:
using a value between 90% and 100% of a total capacity of the lead battery as the second maximum value.

14. The method according to claim 13, further comprising:
using a value of 100% of a total capacity of the lead battery as the second maximum value.

15. An electrical system of an electrically drivable motor vehicle, comprising:
a lead battery;
a lithium battery, electrically coupled to the lead battery via a coupling device;
a first battery monitoring module, assigned to the lead battery;
a second battery monitoring module, assigned to the lithium battery; and
a state-of-charge control device of the lithium battery, comprising a storage device configured to store a lower threshold value, a first upper threshold value, and a second upper threshold value that is above the first upper threshold value, for a state of charge of the lithium battery, and store a first maximum value and a second maximum value larger than the first maximum value for a state of charge of the lead battery, wherein the state-of-charge control device is configured to:
set the state of charge of the lithium battery between the lower threshold value and the second upper threshold value during a driving operation of the motor vehicle;
use the first maximum value as the state of charge of the lead battery during the driving operation of the motor vehicle; and
lower the state of charge of the lithium battery to the first upper threshold value by charging the lead battery up to the second maximum value from the lithium battery when both the motor vehicle is switched off and the state of charge of the lithium battery is greater than the first upper threshold value.

16. The electrical system according to claim 15, wherein the state-of-charge control device is further configured to:
when a temperature of the lithium battery is above a predetermined threshold value, modify the second upper threshold value as a function of the temperature to a value between the second upper threshold value and the first upper threshold value.

17. The electrical system according to claim 15, wherein the lower threshold value is in a range between 10% and 25% of a total capacity of the lithium battery.

18. The electrical system according to claim 15, wherein the first upper threshold value is in a range between 70% and 90% of a total capacity of the lithium battery.

19. The electrical system according to claim 15, wherein the second upper threshold value is in a range between 80% and 100% of a total capacity of the lithium battery.

20. The electrical system according to claim 15, wherein the first maximum value is in a range between 75% and 85% of a total capacity of the lead battery.

* * * * *